United States Patent [19]
Rusk

[11] Patent Number: 4,954,758
[45] Date of Patent: Sep. 4, 1990

[54] POWER SOURCE CIRCUIT

[75] Inventor: George R. Rusk, Forest Park, Ill.

[73] Assignee: Xcel Corporation (Computron Display Systems Division), Pasadena, Calif.

[21] Appl. No.: 221,936

[22] Filed: Oct. 25, 1988

Related U.S. Application Data

[63] Continuation of Ser. No. 784,697, Oct. 3, 1985, which is a continuation-in-part of Ser. No. 316,952, Oct. 30, 1981, abandoned.

[51] Int. Cl.$^5$ .............................................. H01J 29/70
[52] U.S. Cl. ..................................... 315/411; 363/21; 358/190
[58] Field of Search .......................... 315/411; 363/21; 358/190

[56] References Cited

U.S. PATENT DOCUMENTS

| | | |
|---|---|---|
| 4,013,923 | 3/1977 | Den Hollander . |
| 4,079,418 | 3/1978 | Kupka et al. . |
| 4,292,654 | 9/1981 | Steckler et al. . |
| 4,321,514 | 3/1982 | Thibodeau et al. . |
| 4,362,974 | 12/1982 | Dietz . |

Primary Examiner—Theodore M. Blum
Attorney, Agent, or Firm—Louis Bernat

[57] ABSTRACT

The high voltage power supply for the CRT display of a computer system is modified by the addition of tightly coupled, unitarily wound secondary windings feeding current to rectifier diodes oriented to conduct during the horizontal scan. These secondary windings and diodes provide a stable, regulated source of D.C. power for the remaining modules of the computer system.

2 Claims, 5 Drawing Sheets

POWER SOURCE CIRCUIT

This is a continuation application of U.S. Ser. No. 06/784,697, filed Oct. 3, 1985, which in turn was a File Wrapper Continuation-In-Part Application of United States Ser. No. 06/316,952, filed October 30, 1981 now abandoned.

This invention relates to power source systems and more particularly—although not exclusively—to power systems controlled by scanning systems for computer terminals, data display monitors, arcade games, radar, and other CRT based systems.

Computer terminals, data display monitors and the like are generally comprised of separate modules (such as keyboards, cathode ray tube (CRT) displays, floppy disc drives, and logic units). Each of these electronic components usually requires high quality, well regulated power supplies. Therefore, each of the display units or terminals also generally includes a separate power supply chassis which powers the other modules.

Traditional computer power supplies have been relatively design intensive, high-cost, and completely separate units. As the cost and size of computers continues to drop, the cost and size of this traditional type of power supply stands out as an unwarranted proportion of the total system space requirements and cost. Hence, there is a substantial need to reduce cabinet size and power supply cost without, in any way, sacrificing the quality, high efficiency, broad dynamic range, load sensitive regulation, and good filtering that is demanded by sophisticated electronic devices.

Accordingly, an object of the invention is to provide new and improved power sources. Here, an object is to provide space efficient, lower cost power sources. Another object is to reduce the cost of power sources by re-using existing components which are used elsewhere in the system. In particular, an object is to provide power sources which re-use the flyback transformer employed in a high voltage section of a CRT as a major element in the power source regulator.

In keeping with an aspect of the invention, these and other objects are accomplished by using a part of a high voltage circuit in a cathode ray tube display as part of a power source. More particularly, during the CRT scan cycle, a high voltage flyback transformer in the display unit provides a synchronous phase control that switches on a silicon controlled rectifier (SCR) to provide both the conventional high voltage supply for the CRT and an interrupted high current which is of an easily rectified and filtered frequency, to provide a smooth, well regulated power source output. At the end of the scan cycle and during the retrace period, a negative pulse appears in the flyback transformer winding to switch off the SCR and terminate the high current. The power source output is well regulated and the scan cycle frequency is in the range of 10-35 KHz, with a preferred range of about 15-25 KHz. The specific frequencies: 15.750 KHz, 18.3 KHz, 19.2 KHz, 20.5 KHz, are those frequencies which are frequently being used commercially at the present time. These frequencies are easy to filter in order to meet the needs of an electronic circuit. The high voltage and power source may be constructed as a single integrated system, which reduces space requirements and component count.

Various embodiments are shown in the attached drawings wherein.

Figure 1:
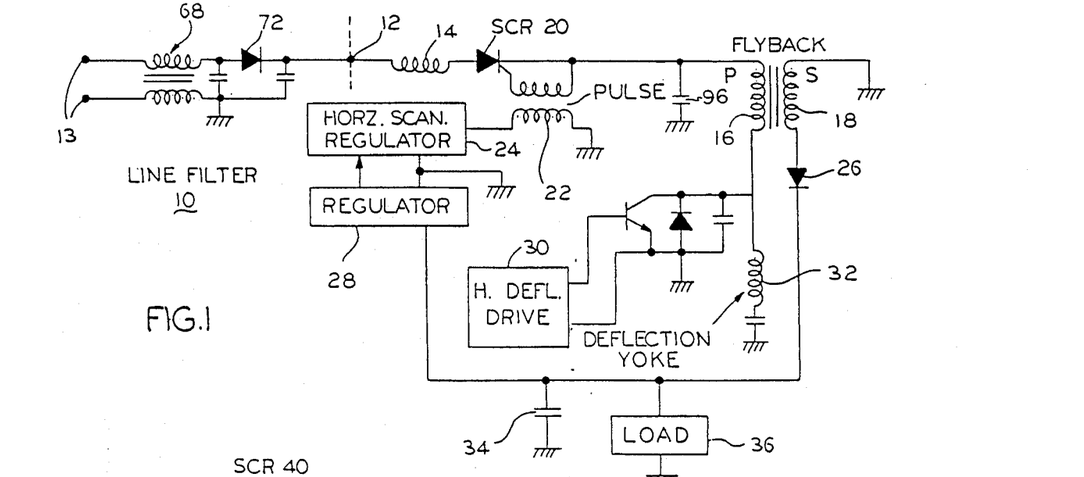
FIG. 1 is a block diagram of a first and preferred embodiment of the inventive power source, using a flyback transformer and an SCR, as a switching device.

In FIG. 1, a line filter 10 (including a rectifier and filter capacitors) maintains a rectified input voltage at terminal 12, responsive to a conventional AC commercial power (or the equivalent) applied to input terminals 13. The flyback transformer (already necessary for the CRT display unit) has a commutating winding 14, a primary winding 16, and one or more secondary windings 18. The flyback transformer is used as a high speed switch for turning off an electronic switch. The synchronization with the flyback transformer may be taken from any convenient component such as a horizontal oscillator, horizontal drive transformer, a separate winding of the flyback transformer, a capacitor in series with the yoke or the like.

The flyback transformer has tightly coupled windings so that current changes in one winding are sensed in all windings. More particularly, according to the invention, the cross-section of the flyback transformer core is larger than the cross-section of a comparable conventional flyback transformer core. The power windings which are added to the conventional flyback transformer as a result of this invention are tightly coupled and are unitarily wound next to the core. For example, if two or three extra windings are required to provide two or three different voltages, two or three wires are placed in parallel and are simultaneously wound onto the core to form a bifilar or trifilar coil. Then, a barrier is placed around these new power windings to establish an insulation having, say, a minimum of 2000 V breakdown barrier. Next, the conventional flyback transformer windings are placed over the barrier.

If two separate and conventional circuits were to be used in a system as computer with monitor and separate power supply circuit, each circuit could have an efficiency of, approximately 85%. When their joint efficiency is calculated, it is not uncommon for it to be down to the order of 30% to 40%. By using the same transformer for both power supply and flyback purposes, joint efficiencies as high as 85% to 90% have actually been measured. Moreover, each of the simultaneously wound windings may provide a different voltage such as +5 V, +12 V, −12 V, etc. For example, the +5 V and −12 V may be used as power supplies for logic circuits. The +12 V may be used as a power supply for a floppy disc drive. Still other uses will be apparent to those skilled in the art.

The terminal 12 is connected to the primary winding 16 by way of the commutating winding 14 and an electronic switch in the form of a thyristor, or almost any member of the thyristor family, here an SCR 20. The gate of the SCR is connected through a pulse transformer 22 to a horizontal scan regulator 24. Thus, the SCR switches on at the cyclic rate of the horizontal scan system set by regulator 28. The SCR switches off when a negative pulse is induced in commutating winding 14 during the retrace period. Preferably, the SCR 20 is an electronic switch with a very fast turn off time, such as less than 3-microseconds.

As the SCR 20 conducts, the primary winding 16 of the flyback transformer is energized to induce a voltage in the secondary winding 18. The pulse induced in the secondary winding 18 is fed back through a diode 26 to a regulator 28 which provides a reference voltage that maintains the desired power source characteristics. The voltage at the bottom (as viewed in FIG. 1) of primary winding 16 is a principal useful output, which powers a horizontal deflection drive output circuit 30 and a deflection yoke 32. The secondary winding 18 powers any other suitable load or loads 36 of the computer system.

It should be noted that, in FIG. 1, B+ appears on the line between the SCR 20 and the top of the primary winding 16. The feedback to control the new power supply is taken from the secondary winding 18, which is electrically isolated from the B+ by the transformer coupling. Thus, the inventive system is being regulated by an isolated voltage appearing in the secondary winding.

Instead of or in addition to horizontal scan regulator 24, a programmable unijunction transistor may be used to cyclically switch on the SCR 20.

The SCR 20 switches on at or near the zero crossing of the regulator 24 output, to supply a rectified DC voltage, which is a well regulated switch on frequency. A rectifier 26 then feeds back a pulse induced in secondary winding 18 during horizontal scan—the feedback being to a regulator 28 which controls regulator 24, that gates the SCR. A smoothing capacitor 34 maintains a steady DC reference voltage responsive to the rectified voltage derived from the voltage induced in secondary winding 18. Alternatively, capacitor 34 could be replaced by a rechargeable battery (such as nickel cadmium battery) which maintains a steady voltage. For switching off the SCR, the circuit depends upon the commutating effects of a high negative pulse in winding 14 on the flyback transformer, the negative pulse appearing during the retrace period.

The electronic switch SCR 20 switches ON and OFF to give a well regulated series of DC pulses. The frequency of the pulses is controlled to establish the level of the voltage by adjusting the volt/second content of the pulses in the continuing pulse train. This is different from the usual B+ power supply where a voltage level is set and the circuitry is primarily designed to hold that set voltage constant and smooth.

The cycle for the flyback transformer controlled diode 26 is about 85% "on" during the horizontal scan and about 15% "off" during retrace, which leads to an efficient output that is easy to filter. The design and capacity of the flyback transformer are adjusted to supply both the conventional high voltage for the CRT and the rectified DC power supply. This reduces both the number of components and the total space requirements.

Figure 2:
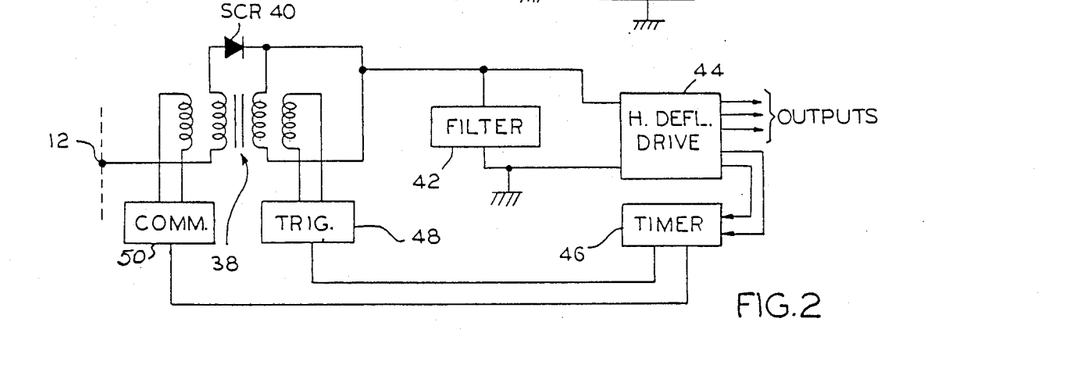
FIG. 2 is a block diagram of a second embodiment of the invention using a pulse transformer and an SCR.

The embodiment of FIG. 2 has a pulse transformer 38 which switches on and off an electronic switch, in the form of SCR 40. The output of the SCR 40 is filtered at 42 and fed as the B+ supply to the horizontal deflection circuit 44. The output of the horizontal deflection circuit 44 is applied to a timer circuit 46. This timer cyclically and alternately operates a trigger circuit 48 and a commutator circuit 50 which control the voltage pulses induced in transformer 38, to switch the SCR 40 on and off with any desired duty cycle.

Figure 3:
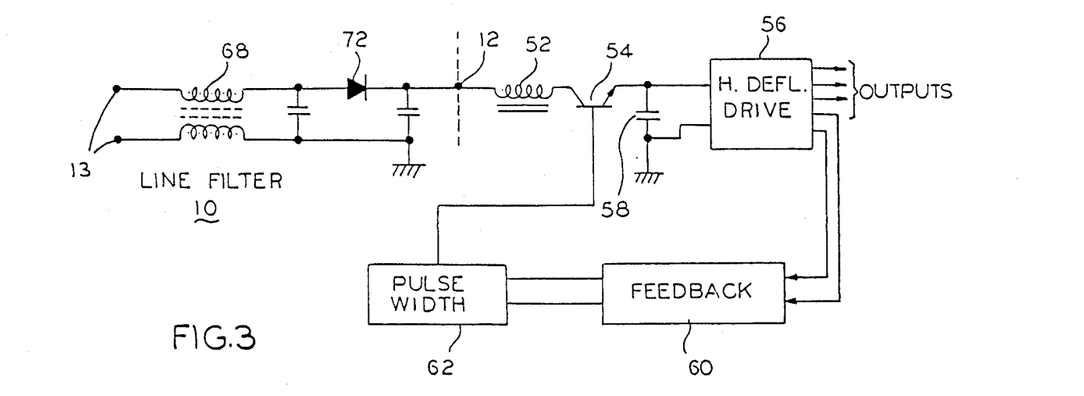
FIG. 3 is a block diagram of a third embodiment of the invention using a transformer and a transistor switch.

The embodiment of FIG. 3 has a choke coil 52 in series with the collector-emitter circuit of an electronic switch, transistor 54. The output of the transistor is applied to a horizontal deflection circuit 56. Capacitor 58 filters and smooths the output voltage. A feedback circuit 60 applies the output voltage to a pulse width modulator 62 which provides cyclically recurring pulses of any desired pulse width, thereby setting the duty cycle of the transistor.

In each of these systems, it is contemplated that the cyclic switching will be in synchronization with the horizontal scan period. However, the invention also contemplates a power switching operation of any convenient, independent time base. Each embodiment contemplates a feedback control operating off a secondary winding of a transformer; however, it is also possible to operate the feedback off the primary winding.

A broad and dynamic operating range of voltages and currents is achieved because high frequency switching devices are used, such as: an SCR, a PUT, and a flyback transformer which has inherent design quality. This use of high frequency devices enables the system to respond quickly and accurately to finite changes in the feed back control.

A schematic circuit diagram (FIG. 4) shows one practical embodiment of the invention. An AC commercial power line is connected to input terminals 64 leading through a fuse 65, a choke coil 68 and a current limiting resistor 79, to a rectifier diode 72. An electrolytic capacitor 74 smooths and filters the rectified voltage to give the B+ supply voltage.

Figure 4:
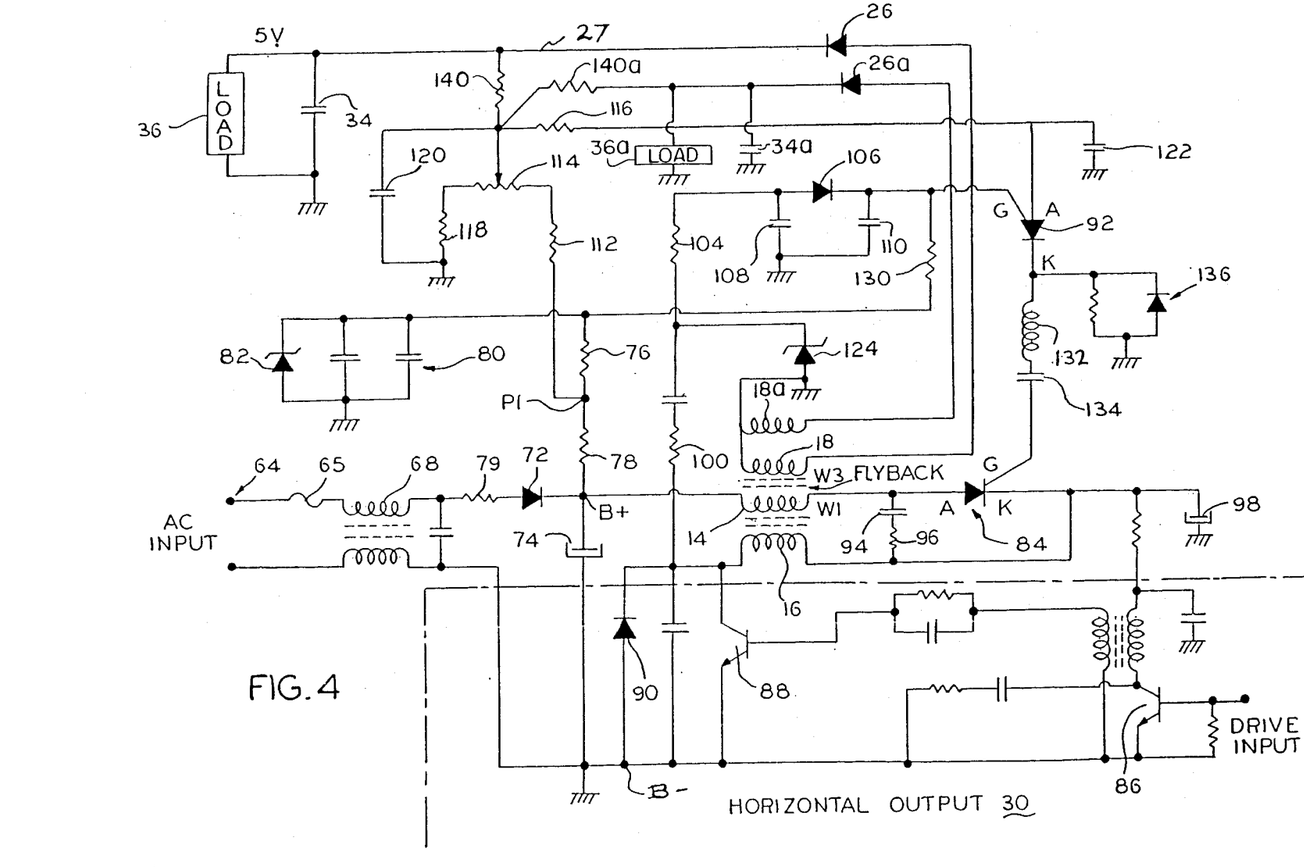
FIG. 4 is a schematic circuit diagram of an exemplary power source circuit using a flyback transformer to control an SCR.

The rectified voltage is applied from diode 72 through a voltage divider 76, 78 to ground via a parallel filter 80 and a zener diode 82. This combination maintains a stable and well regulated reference voltage at the center of the voltage divider (point P1) that provides a differential voltage through resistors 112, 114, 118 and 116 such that variations impressed at AC input 64 can be corrected in a simple matrix of feedback voltages.

The majority of the current from the rectifying diode 72 is applied through commutating winding 14 to the anode of a silicon controlled rectifier (SCR) 84. The commutating winding 14 is part of a flyback transformer having a primary 16 and a secondary winding 18. Therefore, whenever SCR 84 switches on to draw a heavy current, a voltage is induced in the primary and secondary windings. As those skilled in the art know, a negative voltage is induced in commutating winding 14 during the retrace period.

The voltage induced in primary winding 16 energizes the horizontal deflection drive circuit 30, which is a conventional part of the CRT display unit. This horizontal deflection circuit 30 includes a driver transistor 86, an output transistor 88, and a damper diode 90. Since the construction and operation of a horizontal deflection circuit, such as this, is well known, it will not be described further. One point of the invention is that this circuit 30 is powered from the primary winding 16 of the flyback transformer while the auxiliary power supply feedback is taken from the secondary winding 18 which is isolated from the B+ supply.

The regulation of the current through the SCR 84 (which in turn is a regulation of the current through primary winding 16) depends upon a cycle controlled by pulses applied to the SCR gate, the start of which is controlled by a triggering device 92. The device 92 is a programmable unijunction transistor, sometimes called a "PUT". The end of the conductive segment of the cycle is set by the commutating winding 14, which induces a negative pulse to switch the SCR into an off condition.

The cyclic switching of the PUT 92 is controlled by current in the primary winding 16. More particularly, at the start of each CRT scan cycle, the rectified current begins to flow from rectifying diode 72 through winding 14, suppressing capacitor 94, and resistor 96, and a de-coupling filter capacitor 98 to ground. A voltage is induced in primary winding 16. Responsive thereto, a current flow from primary winding 16 through a resistor 100, capacitor 102, resistor 104, and isolating diode 106 to the gate of PUT 92. In this circuit, a pair of parallel capacitors 108, 110 are connected between opposite sides of isolation diode 106 and ground. The charging and discharging times of these two capacitors control the turn-off timing of PUT 92.

The operation depends upon the DC level applied to the anode of PUT 92. That DC level is set by the regulated voltage appearing at point P1, and applied through a voltage divider comprising resistor 112, potentiometer 114, and resistor 118 to ground. The midpoint of this voltage divider is connected through resistor 116 to the anode of PUT 92. The turn off timing of PUT 92 may be adjusted by potentiometer 114. A pair of decoupling capacitors 120, 122 maintain a steady voltage at the anode.

To provide synchronization and maintain regulation, resistor 100 and capacitor 102 provide a positive pulse from primary flyback winding 16. The pulse is adjusted in amplitude by zener diode 124 and added to the gate voltage of PUT 92 through resistor 104 and diode 106, making the trigger point completely synchronous with the horizontal output stage.

The PUT 92 conducts a predetermined time period after current appears in commutating winding 14 of the flyback transformer, that time period being adjusted at potentiometer 114. When the PUT 92 turns on, the charges stored on capacitors 108 and 110 are discharged through PUT 92, choke coil 132 and capacitor 134 to the gate of SCR 84. This discharge is a control pulse which switches on the SCR 84. Circuit 136 includes a parallel resistor and diode which together provide a one-way discharge path for choke coil 132 and capacitor 134.

The SCR 84 remains on during the required portion of the CRT scan period, while a positive voltage is in winding 14 of the flyback transformer. However, when the horizontal deflection circuit 30 reaches the end of the scan and the beginning of its retrace cycle, a high negative pulse appears in a commutating winding 14 which is connected to the anode of SCR 84. When its anode goes more negative than the cathode, the SCR switches off. During the next scan cycle, the process repeats and PUT 92 switches on SCR 84 until the start of the retrace cycle. Therefore, the output of the SCR 84 is a cyclic series of pulses of one polarity.

Resistor 140, diode 26, load 36, and capacitor 34 provide one load for the secondary winding 18 of the flyback transformer. Diode 26 rectifies and capacitor 34 smooths voltage induced in the secondary winding 18. Load 36 may be any suitable auxiliary circuit which is powered by the circuit of FIG. 4.

The voltage on line 27 is sensed through resistor 140, as the controlling signal for maintaining load regulation during any changes which the load may present, in its normal operation. The signal sensed through resistor 140 affects the anode voltage of the PUT 92 and adjusts the firing time of the PUT during a scan period, to give a correction factor for variations of the load demand. If there is fluctuation in the AC input at terminals 64, the fluctuation is reflected at both point P1 and on line 27 so that together they control the anode voltage on PUT 92, to give a correctional factor.

By duplicating these parts at 18a, 26a, 34a, 36a, and 140a, another power supply may be created to supply a different voltage. For example, load 36 may be a logic circuit requiring +5 V and the load 36a may be a floppy disc drive requiring +12 V. These two voltages are fixed by the number of turns in the two secondary windings 18, 18a. The diodes 26, 26a are responsive to very high frequency signals.

In operation, the commercial AC power from the line 64 is rectified at 72 and applied as a B+ battery to the commutating winding 14. There is an initial current through winding 14, capacitor 94, resistor 96, and capacitor 98 to ground. The rectified output of diode 72 also energizes a voltage divider 76, 78 to establish a voltage regulated by zener diodes 82, 124 at the gate and anode of PUT 92.

A voltage is induced in primary winding 16 and applied through resistor 100, capacitor 102, resistor 104 and diode 106 to the gate of PUT 92. The PUT 92 switches on and pulses the gate of SCR 84, which, in turn, switches on, with a heavy current to power the horizontal deflection circuit 30 during the CRT scan period.

At the end of the scan period, the transistor 88 switches off and a positive pulse appears in the primary winding 16 by a normal and well known transformer action. A negative voltage is induced in commutating winding 14 to switch off the SCR 84, during the CRT retrace period.

Hence, there is no need for a completely separate power source because the primary winding 16 of the flyback transformer is energized and self-regulated by the SCR 84. The voltage induced in the secondary winding 18 forms an auxiliary power source to any suitable load or loads 36, during the horizontal scan interval, which is about 85% of the conducting period of rectifier 26. The horizontal scan frequency is 15 KHz or higher, which frequency is easy to filter and smooth. Thus, the flyback transformer which is already present in virtually all CRT control circuits is reused as a power source and control device to produce an easily filtered and well regulated voltage.

Figure 5:
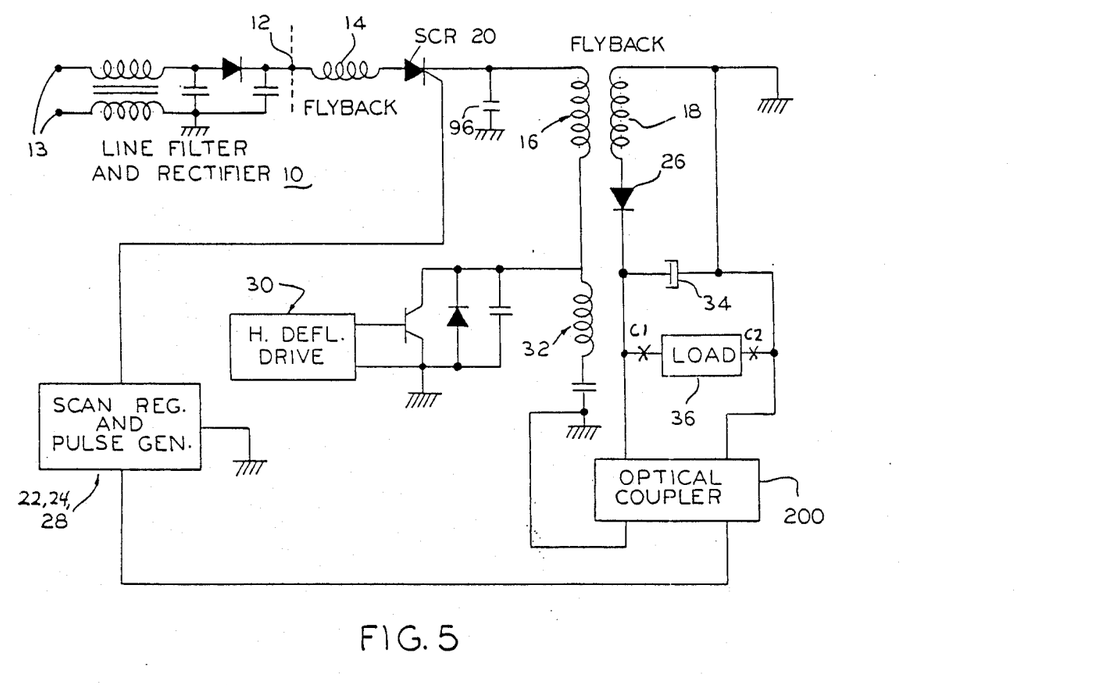
FIG. 5 is a schematic circuit diagram of an alternative embodiment of this invention using an optical coupler.

FIG. 5 is an alternative embodiment which is somewhat similar to the embodiment of FIG. 1, where similar parts have similar reference numerals. The principle of FIG. 5 is that the secondary winding 18 and its associated components and loads are electrically isolated from the AC line 12. Here, an optical coupler 200 (usually LED and photosensitive transistor or the like) is connected into the circuit to provide isolation between the AC line 13 and the load 36. Thus, load 36 may be any remotely powered equipment which may be plugged into a coupler at contracts C1, C2, without any danger that the user might touch a point energized directly from line 13. There could be a plurality of such secondary windings 18 which could jointly provide a plurality of isolated power sources. Since the optical coupler effectively isolates the secondary windings from each other, separate loads may be connected to individual secondary windings so that one load is unaffected by the other load.

Figure 6:
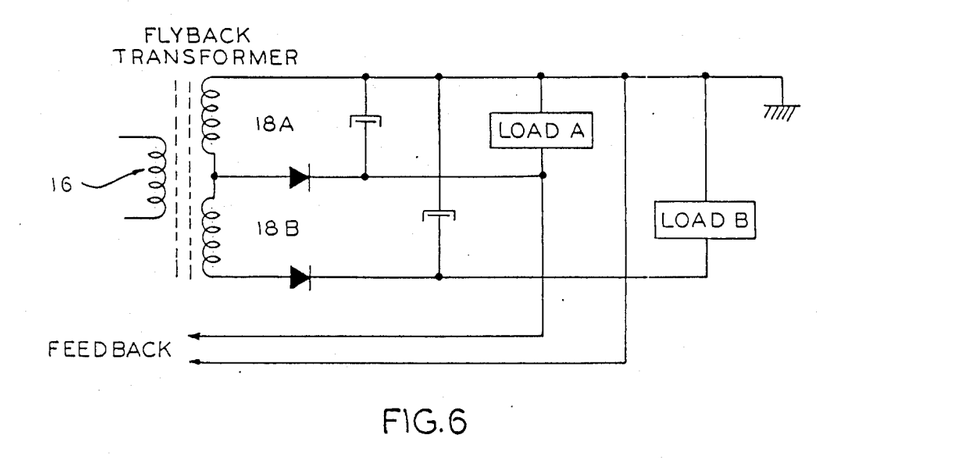
FIG. 6 shows an alternative embodiment of the invention using an especially designed flyback transformer.

FIG. 6 shows, by way of example, a pair of secondary windings 18A, 18B. These windings may be completely independent and totally separate from each other. Each may be controlled by its own feedback circuit. Or, alternatively, by a use of various winding techniques, several independent secondary windings may be formed within a single transformer. In this multiply wound transformer, one winding senses the current in all windings and supplies the resulting signals for feedback regulation.

Figure 7:
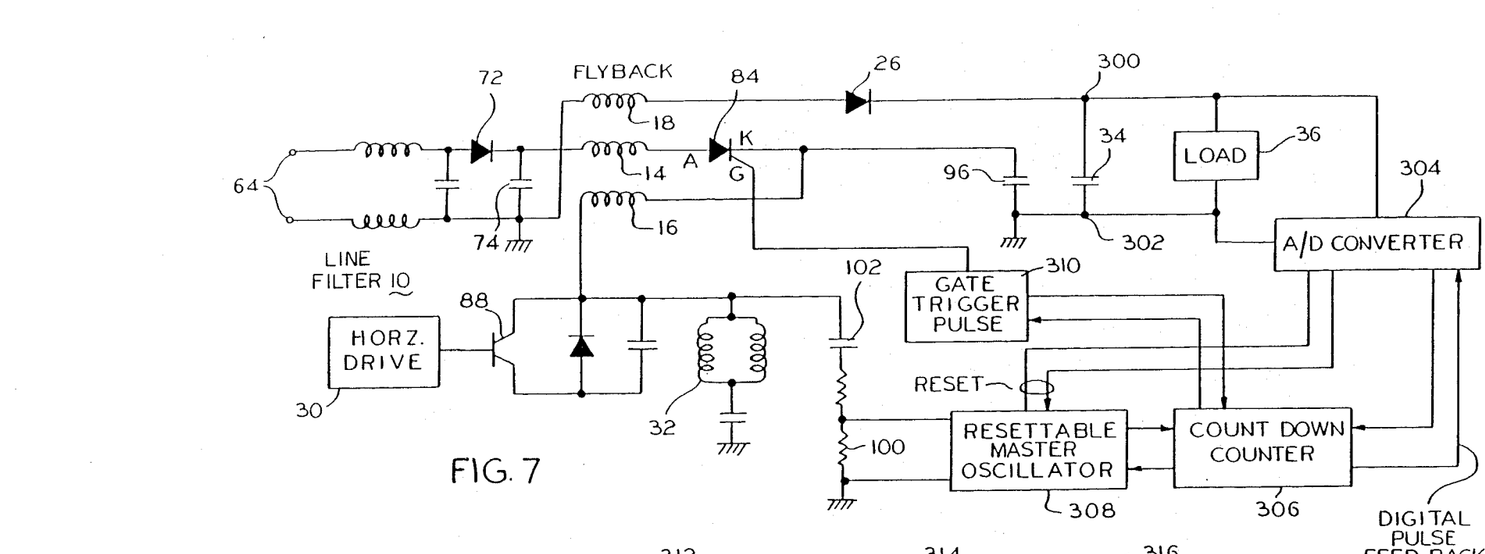
FIG. 7 shows another embodiment of the invention wherein the electronic switch is logically controlled.

FIG. 7 shows a circuit which is similar to the circuits of FIGS. 1 and 4. Those parts which have already been explained have the same reference numerals and will not be explained again.

The load 36 is powered by the inventive system, wherein the power source output voltage appears across conductors 300, 302. This output voltage is subject to analog change responsive to fluctuations at either the power input to terminals 64 or the load 36. The purpose of the circuit is to supply corrective control signals for immediately counteracting the analog changes and returning the voltage to stability.

The analog to digital converter 304 is a voltage controlled oscillator (VCO) which generates a continuous train of pulses having a frequency which is a function of the level input of the voltage. If the analog voltage across lines 300, 302 goes up, the frequency slows; if the analog voltage goes down, the frequency increases. These pulses are counted by a count down counter 306 which is preprogrammed to count a number of pulses and then to give an output. The frequency of the VCO and the preprogrammed count depend upon the resolution that is desired.

Simultaneously with the count down in counter 306, a resettable master oscillator 308 is operated to detect the beginning and ending of each horizontal scan cycle. At the end of each cycle, the master oscillator 308 produces a pulse which resets and returns all of the circuits to normal.

A gate 310 is essentially an AND gate which produces a pulse when the count down counter 306 reaches its preprogrammed count.

Figure 8:
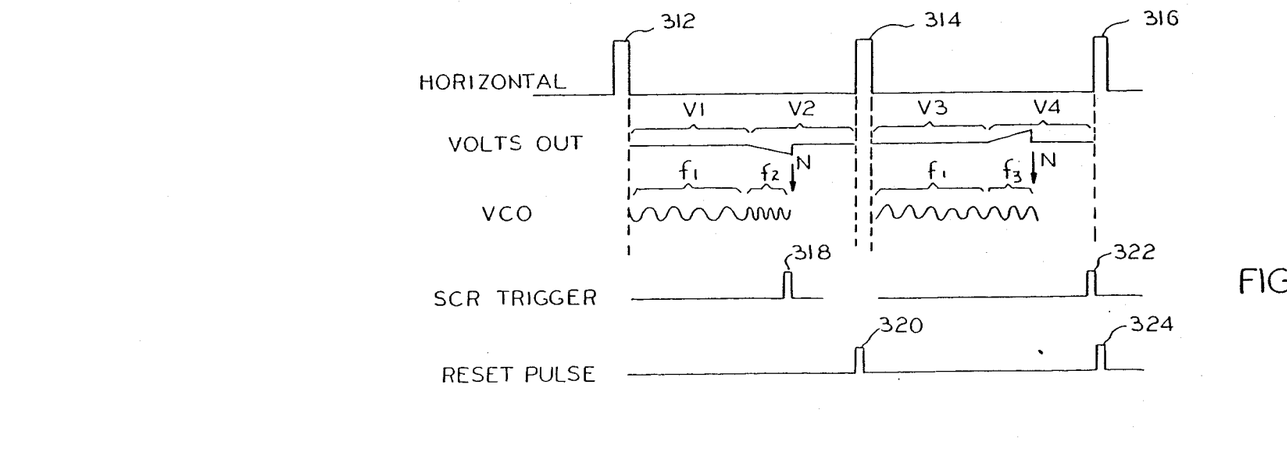
FIG. 8 are voltage curves on a time scale for explaining the operation of the circuit of FIG. 7.

The operation of the circuit of FIG. 7 is explained by the voltage diagram of FIG. 8. Three horizontal scan pulses 312, 314, 316 define two horizontal scan cycles. The voltage out curve describes the voltage impressed between conductors 300, 302. Arbitrarily, it could be assumed that the level during period V1 is, say, 90 volts. In the period V2, the load begins to draw a heavy current and the voltage falls to, say, 89 volts. During period V3, the voltage is once again 90 volts. In the period V4, the load stops drawing a heavy current and the voltage rises to, say, 91 volts.

During time period V1, the output of the VCO of converter 304 has a stable frequency f1. When the voltage across conductors 300, 302 begins to fall during the time V2, the frequency of the VCO increases to f2. Thus, the counter 306 quickly reaches its preprogrammed count "N" to send a trigger pulse 318 through gate 310 to switch on the SCR 84. At the end of the horizontal period, the master oscillator 308 gives a reset pulse 320 to switch off the SCR 84. Thus, the SCR conducts for the relatively long period of time between pulses 318, 320 to return the output voltage to the original level of 90 volts.

In the next cycle, the VCO 304 again operates at the frequency f1. This time, however, the voltage impressed across conductors 300, 302 rises and the VCO frequency slows to f3. This means that it takes longer for counter 306 to reach its preprogrammed count "N", and generate a trigger pulse 322 for switching on the SCR 84. The master oscillator 308 generates pulse 324 to switch off the SCR at the end of the horizontal scan cycle. This time, the SCR 84 was on for the relatively short period between pulses 322, 324. Hence, the voltage output returns to 90 volts during time period V4.

Figures 9, 10:
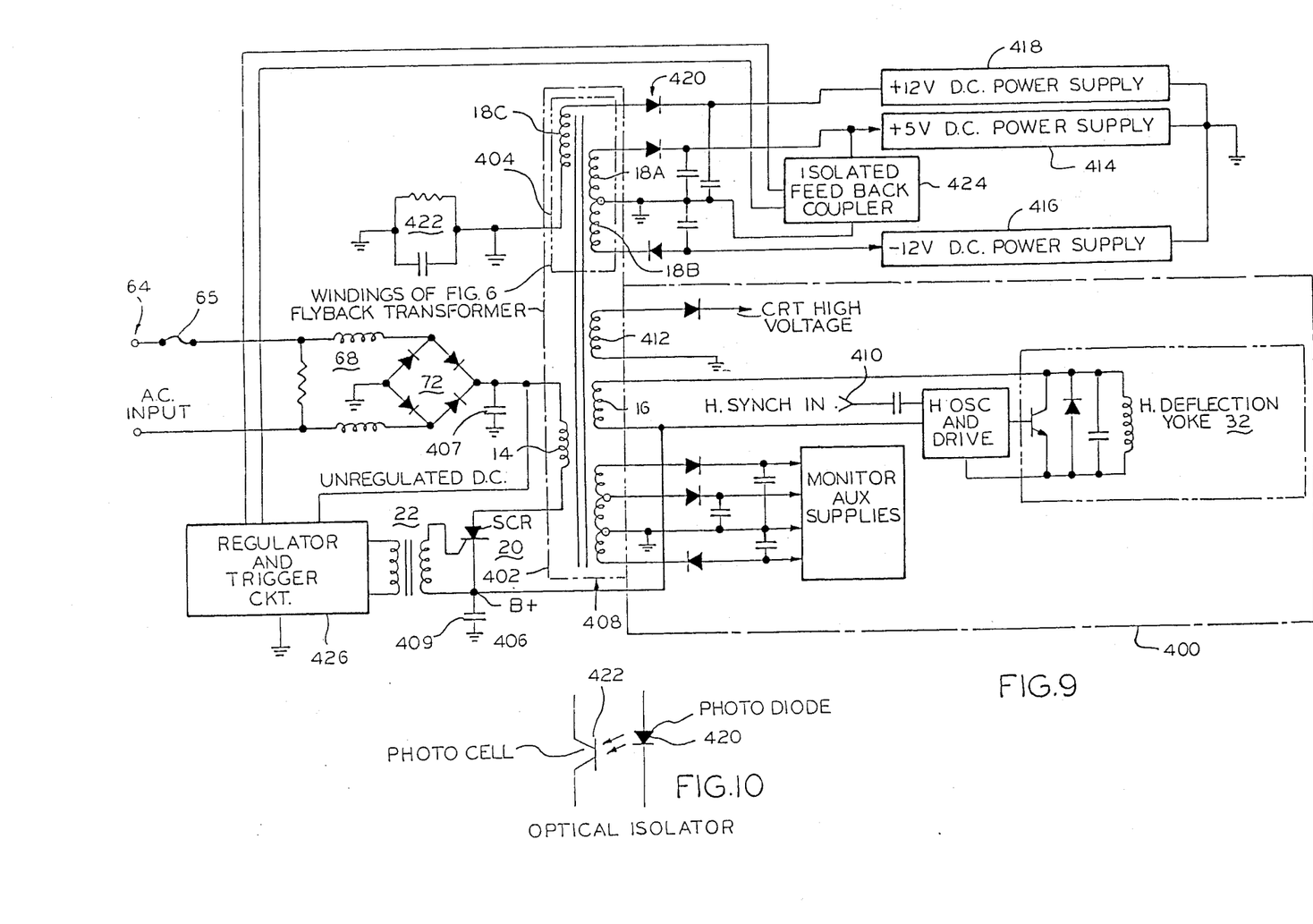
FIG. 9 is a practical circuit which is formed from an assembly of the various circuits shown in the earlier figures.
FIG. 10 shows an optical coupler for producing an isolated feedback.

FIG. 9 shows by way of example how the circuits in the other drawings may be combined to form a practical circuit. The same reference numerals are used in FIG. 9 and other figures to identify parts performing the same functions, which will not be further explained at this point.

The circuitry inside the dot-dashed rectangle 400 is a conventional circuit which may be found in almost any device having a cathode ray tube, such as a home TV receiver or a computer terminal, for example. The flyback transformer windings inside the dot-dashed rectangle 402 include both the conventional windings and the extra windings 404 added by the invention. There is a very tight coupling between all of the power supply windings 18A, 18B, 18C, so that current in any winding is sensed in the other windings. The regulated B+ voltage appears at 406. Decoupling capacitors 407 and 409 provide a filter to ground.

The windings 408, 14, 16, 412 are found in most flyback transformers. They provide pulse-type rectification for low current consumption. The horizontal deflection yoke 32 is powered from windings 14, 16 and is driven responsive to horizontal synchronizing pulses applied at 410. Winding 412 provides the high voltage required by a cathode ray tube.

The windings 18A, 18B, 18C are added to the flyback transformer by this invention in order to provide a variety of different voltages. Thus, for example, winding 18A may provide a +5 volt power supply which could be used to power an electronic logic circuit 414. The winding 18B may, for example, provide a −12 volt power supply for a different kind of logic circuit 416 The winding 18C may be used to provide a +12 volt power supply for a floppy disc drive 418. Still more windings may be provided to supply any suitable number of different voltages. The diodes 420 have high frequency switching capabilities. The filter 422 provides an AC to DC bypass to ground.

An isolation device 424 is coupled to provide feedback between the power output of the windings 18A and a regulator and trigger circuit 426. The feedback is similar to the circuit using diodes 26, 26a and resistors 140, 140a in FIG. 4. The regulator and trigger circuit 426 may take any of many different forms, one being the circuit including PUT 92 shown in FIG. 4.

It should now be apparent that the added windings 18A, 18B, 18C, . . . 18N on the flyback transformer, provide high current, well regulated power outputs which are completely isolated and separate from the supplies normally associated with the flyback transformer. Moreover, the added windings have their own filter and feedback circuits to provide regulation for the added voltages. For example, in FIG. 1, the normal B+ power supply is connected to the primary winding 16 of the flyback transformer. The feedback circuit including diode 26 is connected to the secondary winding 18, which is completely isolated from primary winding 16. The same or a similar isolation is found in all of the other embodiments.

FIGS. 5 and 10 show an optical isolation. For example, the power supply includes a photodiode 420 (FIG. 10), which has almost no thermal inertia. The feedback circuit includes a photocell or phototransistor 422 which has a current proportional to the light emitted by the diode. The optical isolation circuit is faster and less expensive than most other isolation devices.

One advantage of the inventive power source system is that it operates at an efficiency which is much greater than the efficiency normally expected from comparable presently used power supplies. This efficiency occurs because the existing components are reused. Thus, any losses, heat dissipation or other power consuming functions are already in the system and therefore are not duplicated in a power source. Also, the preferred system normally provides for the total power needs of the CRT and associated systems, including slave monitors, logic systems and other peripheral systems.

Those who are skilled in the art will readily perceive how to modify the invention. Therefore, the appended claims are to be construed to cover all equivalent structures which fall within the true scope and spirit of the invention.

I claim:

1. A power source circuit comprising:

a horizontal sweep flyback transformer having a magnetic core with an oversized cross section, having wound next to said core a plurality of unitarily-wound power supply windings, having an insulative layer over said power supply windings, having wound over said insulative layer a primary winding, and also having a high-voltage secondary windings and a commutating secondary winding;

a source of alternating current;

rectification means connecting to said source of alternating current for rectifying said alternating current to provide an unregulated direct current potential source;

voltage regulator means for drawing current intermittently from said unregulated direct current potential source and for providing a non-isolated, regulated direct current potential source, said voltage regulator means including a series circuit formed from the flyback transformer's commutating secondary winding and a triggerable controlled conduction device having a trigger input;

a horizontal sweep circuit comprising two circuit elements connected in series across said non-isolated, regulated direct current potential source, the first circuit element comprising the flyback transformer's primary winding, and the second circuit element comprising the parallel combination of an electronic switch operated at the horizontal sweep frequency rate, a damper diode, and a horizontal deflection coil circuit;

high-voltage rectification means connected in series with the flyback transformer's high-voltage secondary winding and oriented to conduct during horizontal retrace intervals, rather than during horizontal scanning intervals, for rectifying the retrace interval voltage peaks;

a plurality of series circuits formed from diode rectifiers connected in series with filter capacitors, each of said series circuits connecting across one or more of said plurality of power supply windings, said series circuit diode rectifiers being oriented to conduct during horizontal scanning intervals, rather than during horizontal retrace intervals, each of said filtering capacitors forming an isolated, regulated direct current potential source;

at least one high wattage load whose wattage needs fluctuate substantially over time connecting to at least one of said isolated, regulated direct current potential sources; and scan regulator and pulse generation means for regulating said isolated and regulated direct current potential sources by adjusting the timing, relative to the horizontal retrace interval, of trigger pulses provided to said controlled conduction device, said scan regulator and pulse generation means having a feedback input connecting to at least one of said isolated, regulated direct current potential sources and having a pulse output connecting to said trigger input of said controlled conduction device;

whereby a power supply is achieved in which fluctuations in load currents drawn from the isolated, regulated direct current potential sources do not adversely affect the operation of the high voltage and horizontal deflection circuitry.

2. A power supply circuit in accordance with claim 1 wherein the scan regulator and pulse generation means includes a second feedback input connecting to said unregulated direct current potential source.

* * * * *